United States Patent [19]

Uchida et al.

[11] Patent Number: 5,294,911
[45] Date of Patent: Mar. 15, 1994

[54] DATA COMPARATOR

[75] Inventors: Masanori Uchida, Yokohama; Takayasu Sakurai, Tokyo, both of Japan

[73] Assignee: Kabushiki Kaisha Toshiba, Kawasaki, Japan

[21] Appl. No.: 841,638

[22] Filed: Feb. 27, 1992

[30] Foreign Application Priority Data

Feb. 28, 1991 [JP] Japan .................................. 3-034631

[51] Int. Cl.⁵ ............................ G05B 1/03; G06F 7/02
[52] U.S. Cl. .................... 340/146.2; 307/449; 307/463
[58] Field of Search ............. 340/146.2; 307/449, 307/463

[56] References Cited
U.S. PATENT DOCUMENTS 4,857,882  8/1989  Wagner et al. .................. 340/146.2

Primary Examiner—John Zazworsky
Attorney, Agent, or Firm—Finnegan, Henderson, Farabow, Garrett & Dunner

[57] ABSTRACT

According to this invention, a bit data comparing section has a plurality of groups each having a plurality of bit comparators. Each of the plurality of bit comparators compares one bit of address data input to the bit comparator with bit data stored in the bit comparator in advance and outputs a comparison result. Output data from a plurality of bit comparators belonging to one group are unified by one subsense line belonging to the group and input to a control terminal of a switching element. The switching element performs a switching operation in accordance with the input data. A main sense line is connected to the switching element, and a load circuit is connected between the main sense line and a power supply terminal.

30 Claims, 7 Drawing Sheets

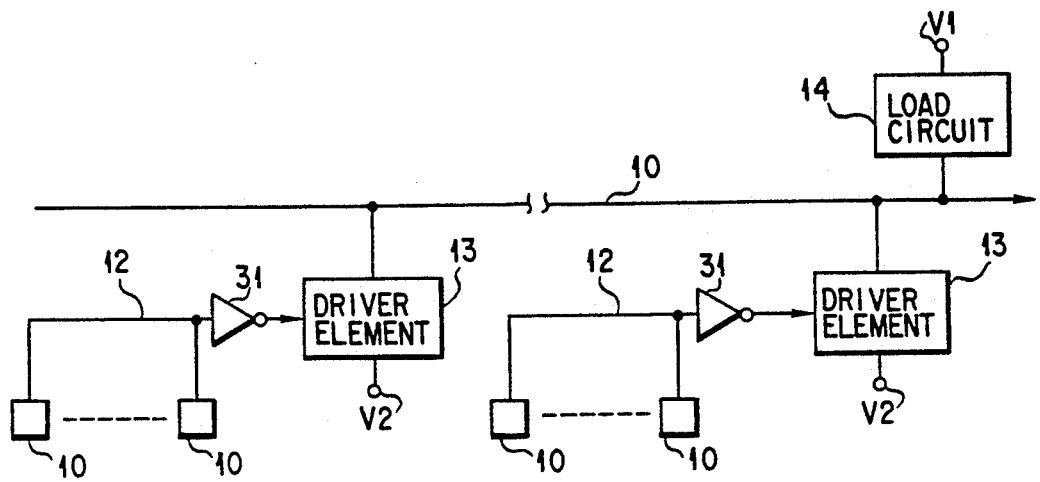
F I G. 5
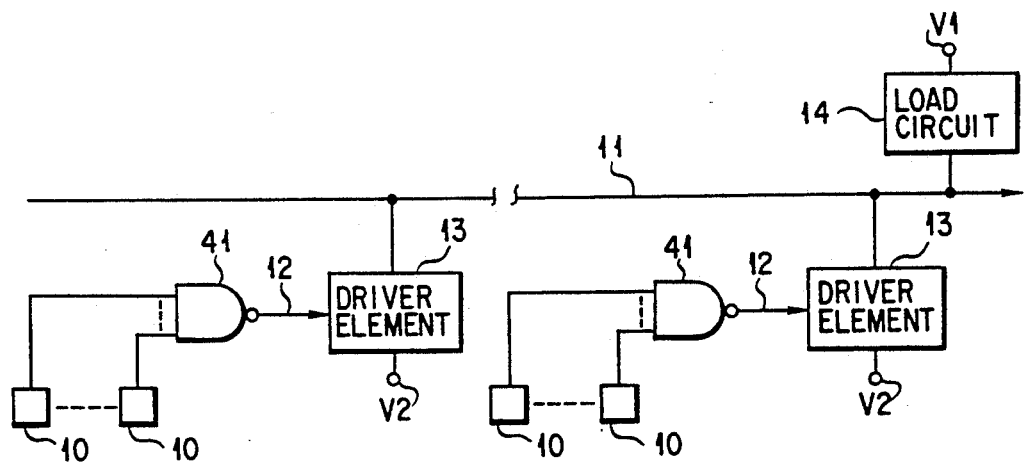
F I G. 6

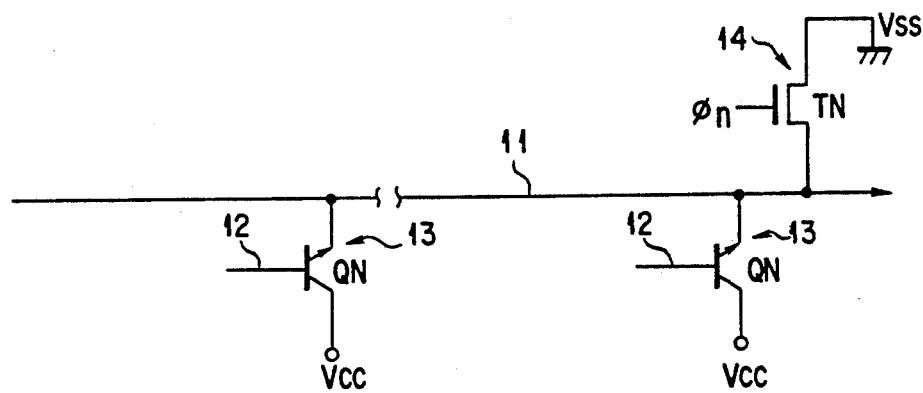
F I G. 10
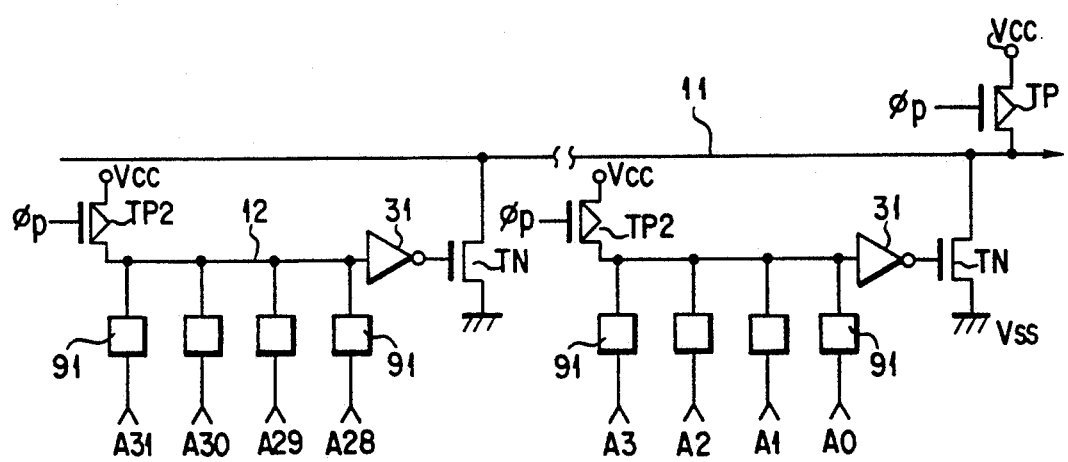
F I G. 12

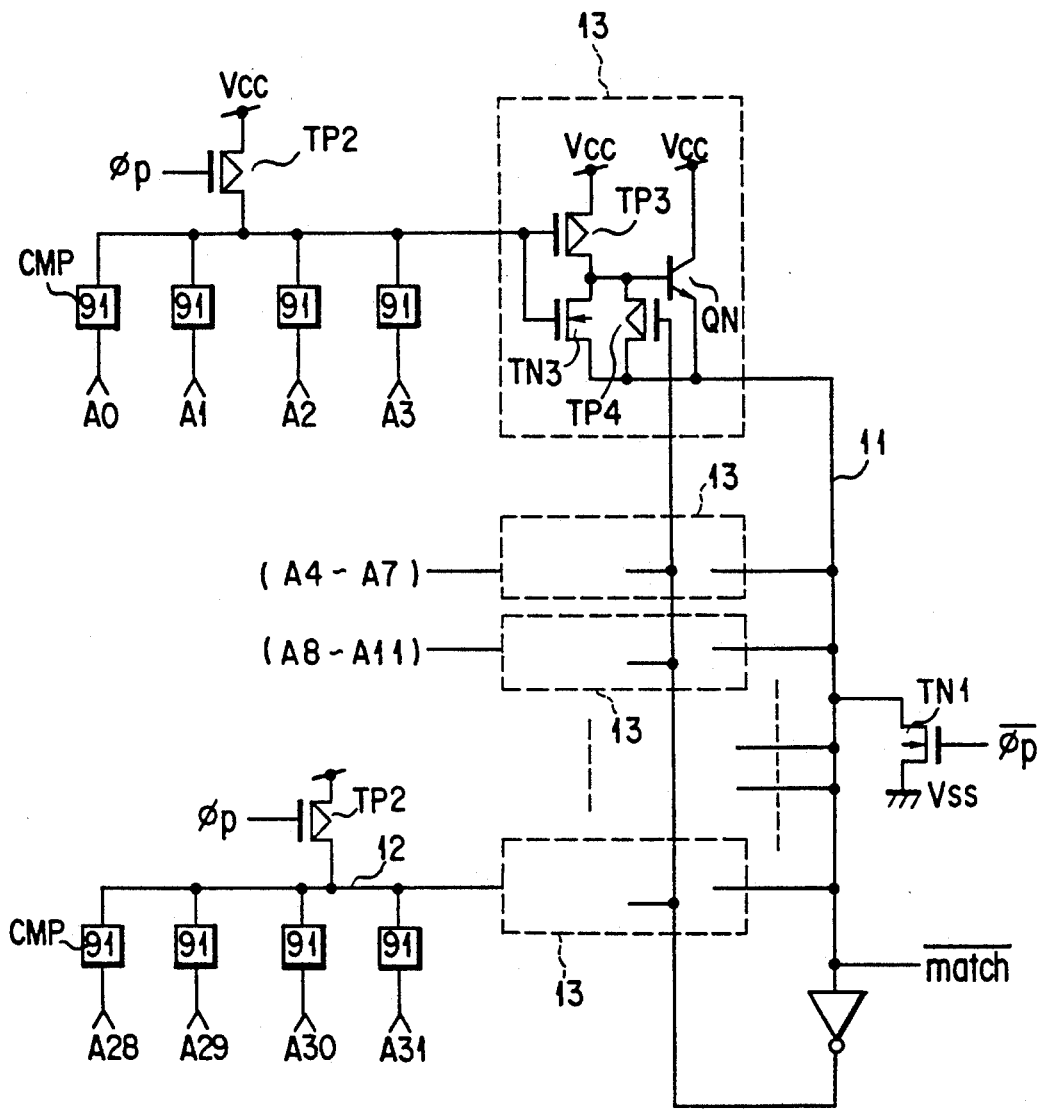
F I G. 13

DATA COMPARATOR

BACKGROUND OF THE INVENTION

1. Field of the Invention

The present invention relates to an improvement of a data comparator used in a TLB (Translation Look-aside Buffer).

2. Description of the Related Art

A conventional data comparator used in a TLB has an arrangement shown in FIG. 1 or 2.

The data comparator in FIG. 1 is constituted by one sense line SL, a precharge p-channel MOSFET TP connected between a precharge power supply terminal Vcc and the sense line SL, and a plurality of bit comparators CMP.

A precharge signal $\phi p$ is applied to the gate of the p-channel MOSFET TP, and a potential of an active level "L" is applied to this gate for a predetermined period. A ground terminal Vss may be connected to the gate of the p-channel MOSFET TP such that a ground potential is always applied to the gate.

Each of the bit comparators CMP has a memory for storing predetermined bit data. Each of the bit comparators CMP compares the bit data with one bit of comparison data A0 to An supplied outside the bit comparators CMP. As a result, when the bit data coincides with one bit of the comparison data A0 to An, the bit comparator CMP outputs the comparison result to the sense line SL.

However, in the data comparator of FIG. 1, the output terminals of the bit comparators CMP are connected to one sense line SL. For this reason, when the number of bits of comparison data is increased, the number of the bit comparators CMP is increased. As a result, a load capacitance of the sense line SL is considerably increased. In fact, when the number of bits of the comparison data is several tens, the load capacitance of the sense line SL poses a problem.

First, the data comparator of FIG. 1 requires a long time for precharging the sense line SL by the precharge MOSFET TP. Second, when the output result obtained from one of the bit comparators CMP is different from output results obtained from the remaining bit comparators CMP, a time for defining the output result of the bit comparator CMP is disadvantageously increased.

In the data comparator of FIG. 2, comparison data is constituted by a plurality of groups (A0 to A3), (A4 to A7), (A8 to A7), (A8 to A11), ..., (An-3 to An). Each of sense lines SL is arranged in each of the groups. As in FIG. 1, a precharge MOSFET TP is connected between a precharge power supply terminal Vcc and the sense lines SL. In addition, each of bit comparators CMP is connected to each one bit of the comparison data A0 to An, and each of the bit comparators CMP is connected to the sense line SL of the group to which corresponding bit comparators belong.

The sense lines SL are connected to the input terminals of a logic gate circuit GT. This logic gate circuit GT outputs comparison results obtained by comparing the bit data with the comparison data A0 to An.

However, in the data comparator of FIG. 2, when the number of bits of the comparison data is increased, the number of the sense lines SL is increased accordingly. For this reason, the logic gate GT having a large number of input terminals is required. Therefore, when the number of bits of the comparison data becomes, e.g., about several tens, a comparison result output speed is decreased, and the comparison results cannot be detected.

SUMMARY OF THE INVENTION

The present invention has been made to solve the above drawback, and has as its object to obtain a data comparator in which a comparison output from the data comparator can be reliably obtained at high speed even when the number of bits of comparison data is increased.

According to the present invention, there is provided a data comparator comprising:

bit data comparing means having a plurality of groups each having a plurality of bit comparators each comparing bit data input to the each bit comparator with bit data stored in the each bit comparator in advance and outputting a comparison result;

output data coupling means having a plurality of subsense lines each arranged in each of the plurality of groups, the each subsense line unifying output data from bit comparators of each group to which each subsense line belongs;

switching means having a plurality of switching elements each arranged in each of the plurality of subsense lines, each switching element having a control terminal, a first terminal, and a second terminal and performing a switching operation in accordance with a potential of a subsense line connected to the control terminal, and the first terminal receiving a first potential;

a main sense line connected to the second terminals of the plurality of switching elements; and a load circuit having a third terminal and a fourth terminal, the third terminal being connected to the main sense line, and the fourth terminal receiving a second potential.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4 to 6 are views showing circuit arrangements of the data comparator of FIG. 3;

FIGS. 7 to 10 are circuit diagrams showing circuit arrangements of a driver element 13 and a load circuit 14 in FIG. 4; and FIGS. 11, 11A, 12, and 13 are circuit diagrams showing circuit arrangements of the data comparator of FIG. 3 in detail.

DETAILED DESCRIPTION OF THE PREFERRED EMBODIMENTS

An embodiment of the present invention will be described below with reference to the accompanying drawings.

Figure 1:
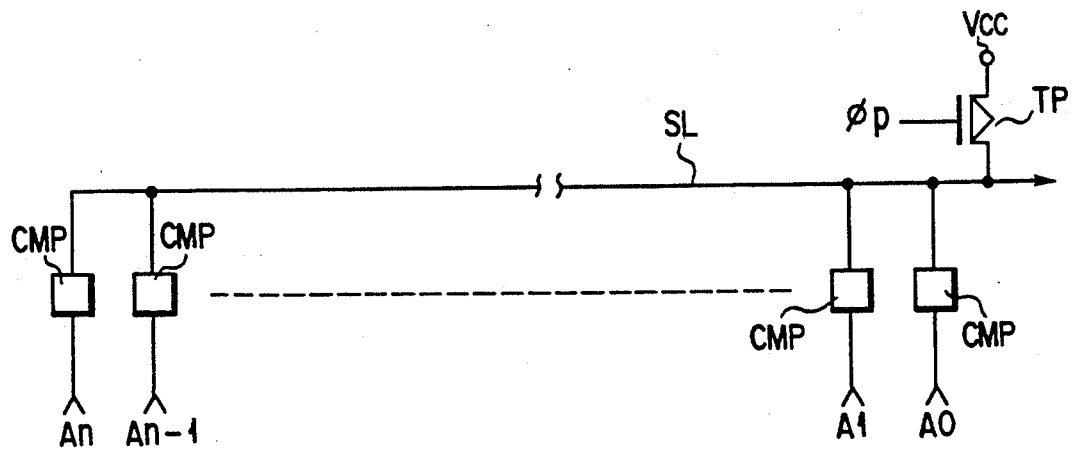
FIGS. 1 and 2 are circuit diagrams showing conventional data comparators.
Figure 2:
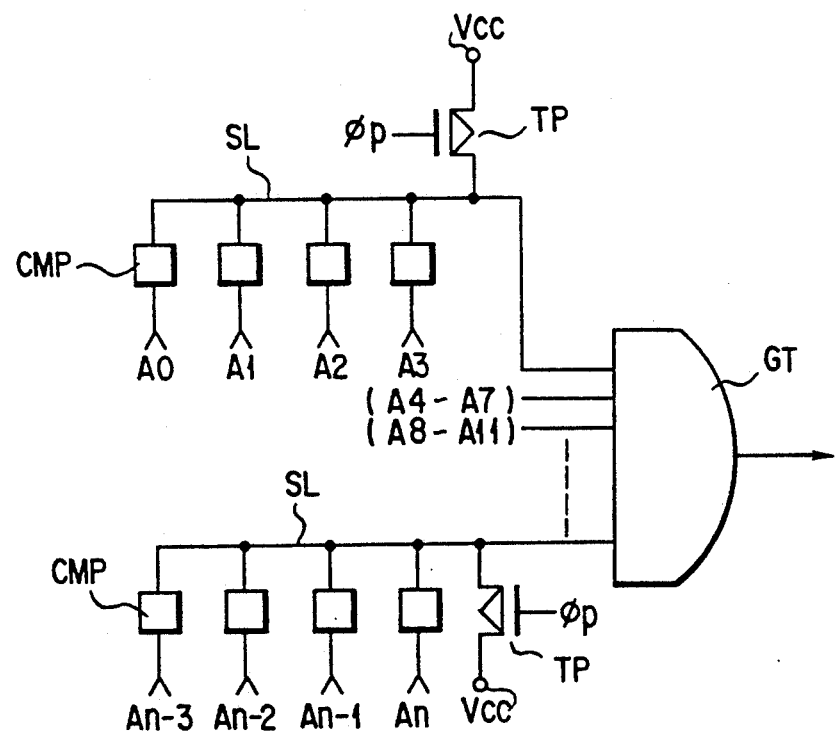
Figure 3:
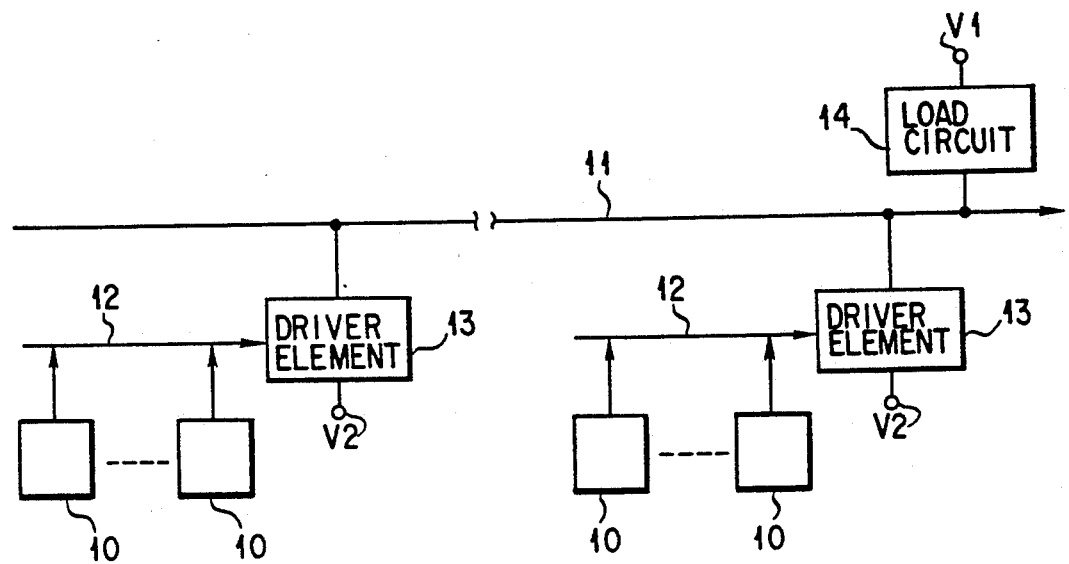
FIG. 3 is a view showing a basic arrangement of a data comparator according to the present invention.

FIG. 3 shows the basic arrangement of a data comparator according to the present invention. According to the present invention, comparison data has groups each of which is constituted by a plurality of bits, and each of subsense lines 12 is arranged in each of the groups. Each of the bit comparators 10 is arranged in each bit of comparison data, and each of the bit comparators 10 is connected to each of the subsense lines 12 to which the corresponding bit comparators 10 belong. Each of the subsense lines 12 is connected to each of the driver elements 13. Each of the driver elements 13 performs a switching operation in accordance with the potential of the subsense line 12 connected to the corresponding driver element 13. The driver elements 13 are connected to a main sense line 11. A load circuit 14 is connected between the main sense line 11 and a potential terminal V1. In addition, the driver elements 13 are connected to potential terminal V2.

Figure 4:
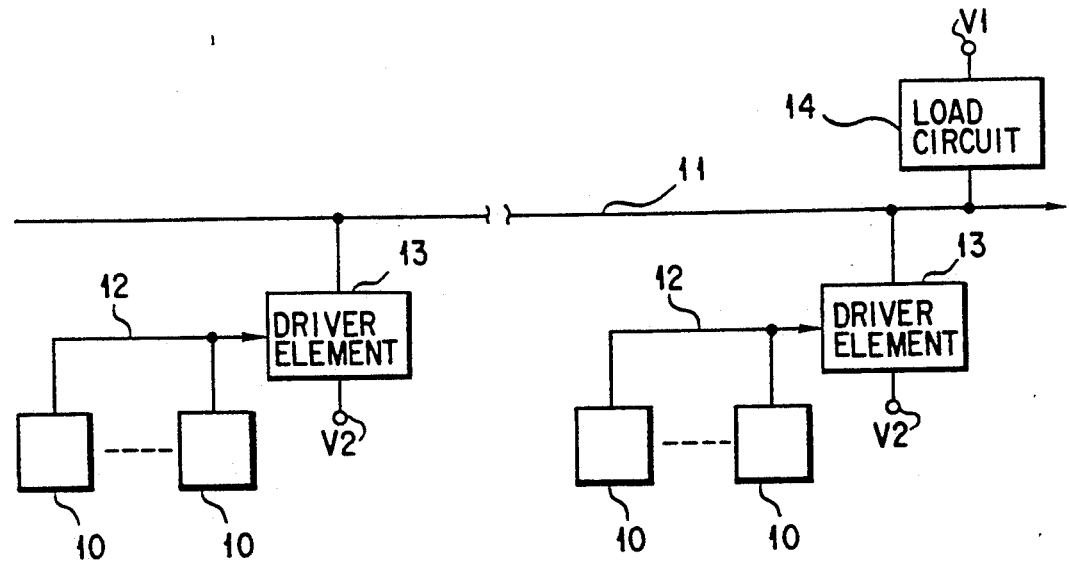

FIGS. 4 to 6 show circuit arrangements in the data comparator of FIG. 3. In the circuit arrangements, the plurality of bit comparators 10 which belong to one group are connected to each of the subsense lines 12, and the driver elements 13 connected to the subsense lines 12 are controlled.

In FIG. 4, the plurality of bit comparators 10 which belong to one group are connected to one of the subsense lines 12, and the subsense line 12 which belongs to each of the groups is directly connected to each of the driver elements 13.

In FIG. 5, the plurality of bit comparators 10 which belong to one group are connected to one of the subssense lines 12, and the subsense line 12 which belongs to each of the groups is connected to each of the driver elements 13 through one of inverting circuits 31.

In FIG. 6, each of logic gate circuits 41 is arranged in each group, and the bit comparators 10 which belong to one group are connected to the plurality of input terminals of each of the logic gate circuits 41. The output terminal of each of the logic gate circuits 41 is connected to each of the driver elements 13 through one of the subsense lines 12.

FIGS. 7 to 10 show circuit arrangements of the driver circuits 13 and the load circuit 14 in the circuit of FIG. 4.

Figure 7:
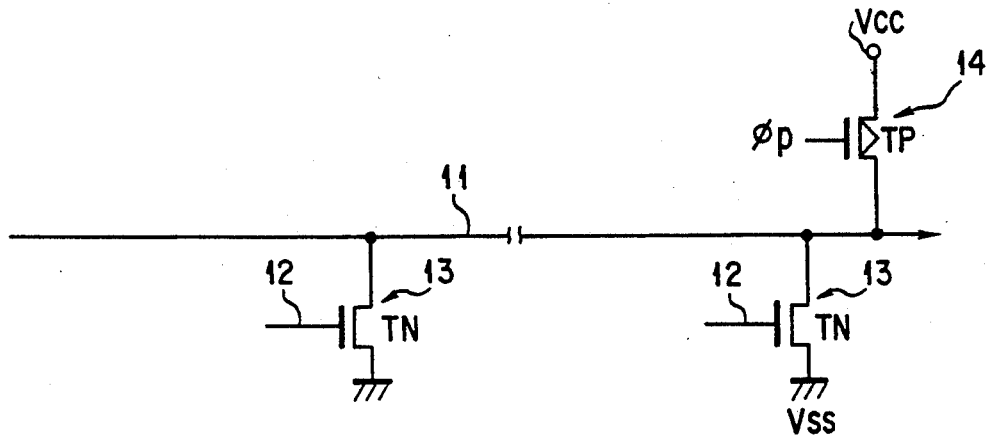

In FIG. 7, a p-channel MOSFET TP is used as the load circuit 14, and n-channel MOSFETs TN each having the gate connected to one of the subsense lines 12 are used as the driver elements 13. In this case, a potential terminal V1 preferably has a power supply potential (positive) Vcc, and a potential terminal V2 preferably has a ground potential Vss. However, the potential terminal V1 may have a power supply potential (negative) Vcc, and the potential terminal V2 may have the ground potential Vss. In addition, the potential terminal V1 may have the ground potential, and the potential terminal V2 may have the power supply potential (negative). The potential terminal V1 may have the ground potential, and the potential terminal V2 may have the power supply potential (positive).

A precharge signal $\phi p$ is supplied to the gate of the p-channel MOSFET TP, and a potential of an active level (in this case, "L" level) is applied to the gate for a predetermined period. The ground potential Vss may always be applied to the gate of the p-channel MOSFET TP.

A pnp bipolar transistor having the base receiving the precharge signal $\phi p$ or the ground potential Vss may be used as the load circuit 14.

Figure 8:
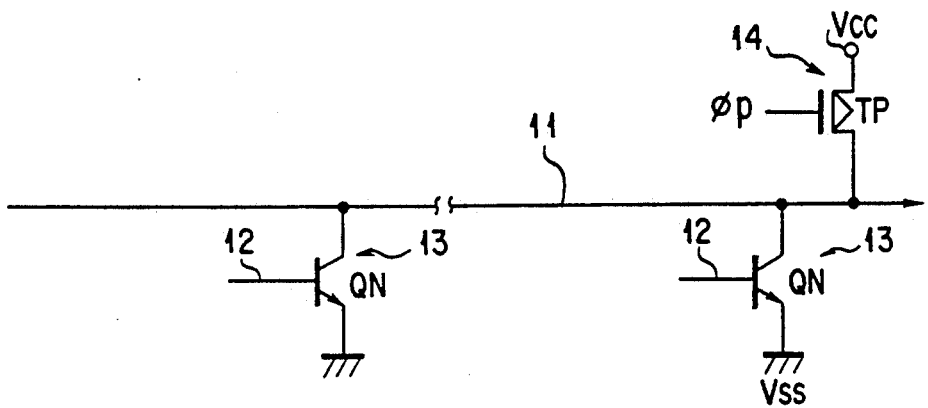

Referring to FIG. 8, in the circuit of FIG. 7, npn bipolar transistors QN each having the base connected to one of the subsense lines 12 are used as the driver elements 13.

Figure 9:
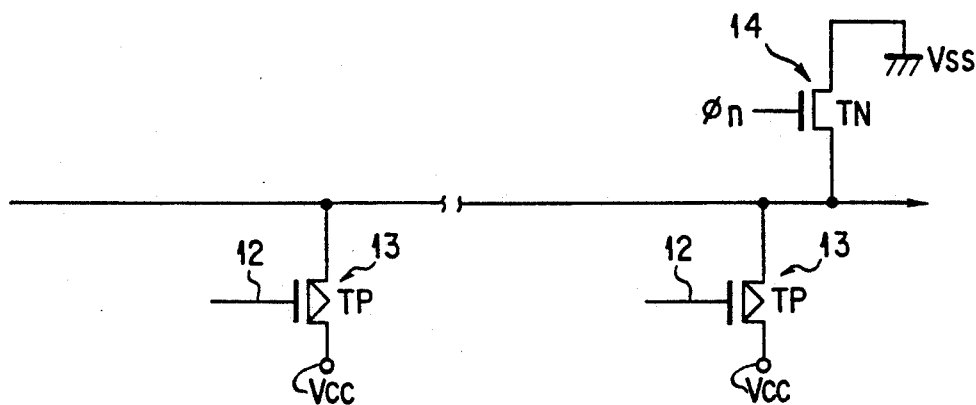

In FIG. 9, an n-channel MOSFET TN is used as the load circuit 14, and p-channel MOSFETs TP each having the gate connected to one of the subsense lines 12 are used as the driver circuits 13. In this case, the potential terminal V1 preferably has the ground potential Vss, and the potential terminal V2 preferably has the power supply potential (positive) Vcc. However, the potential terminal V1 may have the ground potential Vcc, and the potential terminal V2 may have the power supply potential (negative) Vss. In contrast to this, the potential terminal V1 may have the power supply potential (positive), and the potential terminal V2 may have the ground potential. In addition, the potential terminal V1 may have the power supply potential (negative), and the potential terminal V2 may have the ground potential.

A precharge signal $\phi n$ is supplied to the gate of the n-channel MOSFET TN, and a potential of an active level (in this case, "H" level) is supplied to the gate for a predetermined period. Note that the power supply potential Vcc may always be applied to the gate of the n-channel MOSFET TN.

An npn bipolar transistor having the base receiving the precharge signal $\phi n$ or the power supply potential Vcc may be used as the load circuit 14.

Referring to FIG. 10, in the circuit of FIG. 9, npn bipolar transistors QN each having the base connected to one of the subsense lines 12 are used as the driver elements 13

An operation of the data comparator according to the present invention will be described below.

In the circuits of FIGS. 7 and 8, each of the potentials of the subsense lines 12 is set to "L" level before data are compared with each other. Therefore, each of the driver elements 13 is set in an OFF state, and the potential of the main sense line 11 is set to "H" level. In data comparison, if bit data input to all the bit comparators 10 coincide with corresponding bits of comparison data, the potentials of all of the subsense lines 12 are kept to be set to "L" level. Therefore, all of the driver elements 13 are set in an OFF state. If bit data does not coincide with one bit of the comparison data corresponding to the bit data in the bit comparators 10 which belong to one group, the potential of the subsense line 12 in this group goes to "H" level. Therefore, the driver element 13 connected to the subsense line 12 in the group is turned on, and the potential of the main sense line 11 goes to "L" level.

In the circuit of FIG. 9, the potential of each of the subsense lines 12 is set to "H" level before data are compared with each other. Therefore, each of the driver elements 13 is set in an OFF state, and the potential of the main sense line 11 is set to "L" level. In data comparison, if bit data input to all the bit comparators 10 coincide with corresponding bits of comparison data, the potentials of all of the subsense lines 12 are kept to be set to "H" level. Therefore, all the driver elements 13 are set in an OFF state. If bit data do not coincide with corresponding bits of comparison data in the bit comparators 10 constituting one group, the potential of the subsense line 12 in this group goes to "L" level. Therefore, the driver element 13 connected to the subsense line 12 in the group is turned on, and the potential of the main sense line 11 goes to "H" level.

In the circuit of FIG. 10, the potential of each of the subsense lines 12 is set to "L" level before data are compared with each other. Therefore, the driver elements 13 are set in an OFF state, and the potential of the main sense line 11 is set to "L" level. In data comparison, if bit data input to all the bit comparators 10 coincide with corresponding bits of comparison data, the potentials of all the subsense lines 12 are kept to be set to "L" level. Therefore, all the driver elements 13 are set in an OFF state. If bit data do not coincide with corresponding bits of comparison data in the bit comparators 10 constituting one group, the potential of the subsense line 12 in this group goes to "H" level. Therefore, the driver element 13 connected to the subsense line 12 in the group is turned on, and the potential of the main sense line 11 goes to "H" level.

Figure 11A:
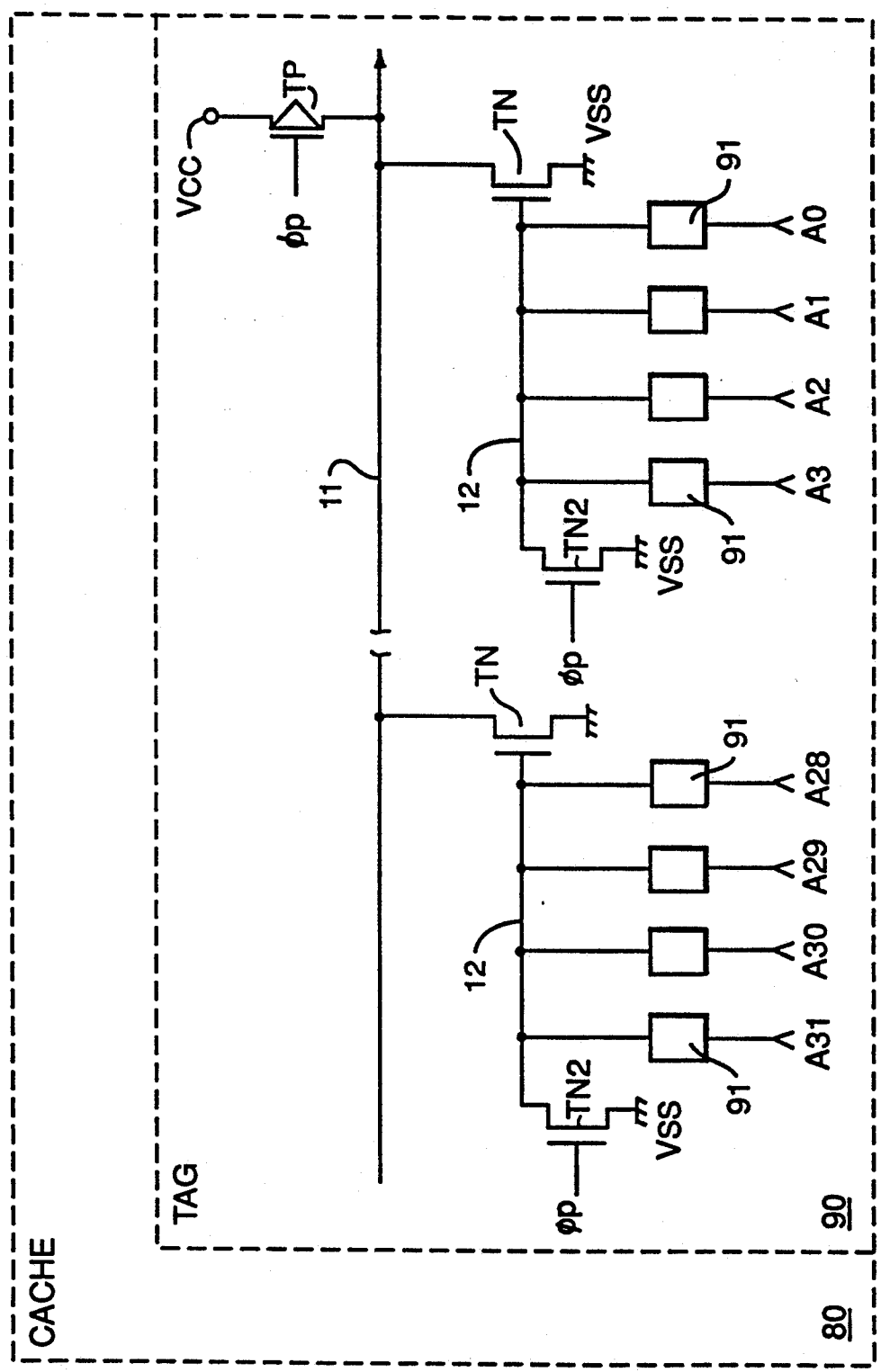

FIG. 11 shows the first embodiment of the present invention. The first embodiment, as shown in FIG. 11A, relates to a data comparator for comparing data stored in a memory cell of a CAM (Content Addressable Memory) used in, e.g., a tag memory section 90 of a cache memory 80 with tag address data (comparison data to be retrieved) A0 to A31 from a CPU (Central Processing Unit).

The cache memory is arranged between the CPU and the main memory to decrease a difference between a cycle time of the CPU and an access time of the main memory. The cache memory is a high-speed memory capable of improving the working efficiency of the CPU. The cache memory is arranged in a semiconductor chip other than the semiconductor chip on which the CPU is mounted, or it is arranged on the same chip as that of a logic and arithmetic processing block such as a CPU. Note that the cache memory may be mounted on a chip on which other memories are mounted.

In the circuit of FIG. 11, comparison data have a plurality of groups (A0 to A3), . . . , (A28 to A31) each having several bits. The output terminals of CAM cells (including a match logic circuit) 91 in one group are connected to one subsense line 12. N-channel MOSFETs TN are used as driver elements. A p-channel MOSFET TP is used as a load circuit. An n-channel MOSFET TN2 is connected between the subsense lines 12 and a ground potential Vss. A precharge signal $\overline{\phi p}$ complementary to a precharge signal $\phi p$ or a power supply potential Vcc is applied to the gate of each of the n-channel MOSFETs TN2. An npn bipolar transistor may be used as a transistor connected between each of the subsense lines 12 and the ground potential Vss. In this case, the precharge signal $\phi p$ or the power supply potential Vcc is applied to the base of the npn bipolar transistor.

In the circuit of FIG. 11, the potentials of the subsense lines 12 are set to "L" level before data are compared with each other. Therefore, the driver elements 13 are set in an OFF state, and the potential of the main sense line 11 is set to "H" level. In data comparison when data of the CAM cells 91 coincide with each other in each of all the groups, the potentials of the subsense lines 12 are kept to be set to "L" level. Therefore, all the driver elements 13 are set in an OFF state. If data of the CAM cells 91 in one group do not coincide with each other, the potential of the subsense line 12 of this group goes to "H" level. Therefore, the driver element 13 connected to this subsense line 12 is turned on, and the potential of the main sense line 11 goes to "L" level.

In the data comparator according to the first embodiment, comparison data is constituted by a plurality of groups, and the CAM cells 91 which belong to each of the groups are connected to each of the subsense lines 12. A sense line is constituted by one main sense line 11 and the subsense lines 12 which are arranged in each of the groups. In addition, driver elements TN are connected between the main sense line 11 and the subsense lines 12. For this reason, even when the number of bits of comparison data is large, the load capacitances of the subsense lines 12 are not decreased. Even when an output from one of the CAM cells 91 is different from outputs from all the remaining CAM cells 91, a detection speed of comparison results is not decreased. Furthermore, since each of the driver elements TN transmits a comparison result of each of the groups to the main sense line 11, the comparison results of the groups can be unified.

FIG. 12 shows a data comparator according to the second embodiment of the present invention. According to this embodiment, unlike in the first embodiment, inverting circuits 31 are connected between subsense lines 12 and driver elements TN, and load circuits each constituted by, e.g., a p-channel MOS transistor TP2, are connected between a power supply potential Vcc and the subsense lines 12.

According to the second embodiment, the same effect as in the first embodiment can be obtained. The main sense line 11 and the subsense lines 12 can be arranged parallelly to each other. In this case, the main sense line 11 and the subsense lines 12 can be arranged without an increase in area on a chip with respect to a pattern layout.

FIG. 13 shows the third embodiment of the present invention. According to the present invention, in a data comparator, a signal from a subsense line is input to a BiCMOS gate to cause an npn bipolar transistor to drive a main sense amplifier.

Comparison data has a plurality group each having several bits. For example, 32-bit comparison data is constituted by 8 groups, and each of the groups is constituted by four bits (A0 to A3), . . . , or (A28 to A31). Each of CAM cells (including a match logic circuit) 91 is arranged in each of the bits of the comparison data. The CAM cells 91 in one group are connected to one of subsense lines 12.

BiCMOS pull-up driver circuits are used as driver elements 13. Each of the BiCMOS pull-up driver circuits is constituted by a p-channel MOSFET TP3 having the gate connected to one of the subsense lines 12 and the source receiving a power supply potential Vcc, an npn bipolar transistor QN having the collector receiving the power supply potential Vcc, the emitter connected to a main sense line 11, and the base connected to the gate of the p-channel MOSFET TP3, an n-channel MOSFET TN3 having the drain connected to the base of the npn bipolar transistor QN, the gate connected to one of the subsense lines 12, and the source connected to the main source line 11, and a p-channel MOSFET TP4 having the source connected to the base of the npn bipolar transistor QN, the gate connected to the inverting output terminal of the main sense line 11, and the drain connected to the main sense line 11.

An n-channel MOSFET TN1 and a p-channel MOSFET TP2 are used as the load circuit of the main sense line 11. A precharge signal $\bar{\phi}p$ having a potential of an active level (in this case, "H" level) or a power supply potential Vcc is applied to the gate of the n-channel MOSFET TN1 for a predetermined period. A precharge signal $\bar{\phi}p$ complementary to the precharge signal $\phi p$ or a power supply potential Vss is applied to the gate of the p-channel MOSFET TP2.

An operation of the circuit of FIG. 13 will be described below. Since each of the potential of the subsense lines 12 is set to "H" level before data are compared with each other, the driver gates are set in an OFF state, and the potential of the main sense line 11 is set to "L" level.

In data comparison, when the addresses of all the CAM cells 91 coincide with each other, the potentials of the all the subsense lines 12 are kept to be set to "H" level. Therefore, all the BiCMOS pull-up driver circuits 13 are set in an OFF state, and the main sense line 11 is set to "L" level. If the address of one of the CAM cells 91 does not coincide with the addresses of the other CAM cells 91, the potential of the subsense line 12 in the group to which the CAM cells 91 belong goes to "L" level. Therefore, the BiCMOS pull-up driver circuit 13 connected to the subsense line 12 is turned on, and an output from the main sense line 11 goes to "H" level. Since a signal from an inverter receiving an output from the main sense line 11 goes to "L" level, the potential of the main sense line 11 becomes a power supply potential Vcc. This is because the potential of the main sense line 11 shunted by the p-channel MOSFET TP4 in the pull-up driver circuit 13.

According to the third embodiment, the load capacitance such as the diffusion layer capacitance of MOSFETs connected to subsense lines is decreased, and a detection speed of comparison results is increased. In addition, since a pull-up driver circuit having a BiCMOS arrangement is used, no MOSFET is directly connected to the main sense line, a bipolar transistor having a small load capacitance is connected to the main sense line. Therefore, the load capacitance of the main sense line is advantageously decreased.

In a precharging operation, in accordance with an increase in potential of a subsense line caused by a load element, the BiCMOS pull-up driver circuit is turned off, and the potential of the main sense line is sharply decreased. At the same time, the n-channel MOSFET TN3 in the pull-up driver circuit extracts base accumulation charges from the bipolar transistor, and the bipolar transistor is rapidly turned off.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data comparator comprising:
   bit data comparing means having a plurality of groups, each of said groups having a plurality of bit comparators, and each of said bit comparators comprising bit data input to said each of said bit comparators with bit data stored in said each of said bit comparators in advance and outputting a comparison result;
   output data coupling means having a plurality of subsense lines, each of said subsense lines arranged in a respective one of said plurality of groups, said each of said subsense lines unifying output data from bit comparators of said respective one of said groups to which said each of said subsense lines belongs;
   switching means having a plurality of switching elements, each of said switching elements arranged in a respective one of said plurality of subsense lines, said each of said switching elements having a control terminal, a first terminal, and a second terminal and performing a switching operation in accordance with a potential of said respective one of said subsense lines connected to said control terminal, and said first terminal receiving a first potential, wherein each of said plurality of subsense lines is directly connected to a control terminal of one of said switching elements;
   a main sense line connected to said second terminals of said plurality of switching elements; and
   a load circuit having a third terminal and a fourth terminal, said third terminal being connected to said main sense line, and said fourth terminal receiving a second potential.

2. A comparator according to claim 1, wherein the first potential is a ground potential Vss, the second potential is a power supply potential Vcc, said load circuit is a p-channel MOSFET having a gate receiving the ground potential Vss, and each of said switching elements is an n-channel MOSFET having a gate connected to one of said subsense lines.

3. A comparator according to claim 1, wherein the first potential is a ground potential Vss, the second potential is a power supply potential Vcc, said load circuit is a p-channel MOSFET having a gate receiving a precharge signal, and each of said switching elements is an n-channel MOSFET having a gate connected to one of said subsense lines.

4. A comparator according to claim 1, wherein the first potential is a ground potential Vss, the second potential is a power supply potential Vcc, said load circuit is a pnp bipolar transistor having a base receiving the ground potential Vss, and each of said switching elements is an n-channel MOSFET having a gate connected to one of said subsense lines.

5. A comparator according to claim 1, wherein said first potential is a ground potential Vss, the second potential is a power supply potential Vcc, said load circuit is a pnp bipolar transistor having a base receiving a precharge signal, and each of said switching elements is an n-channel MOSFET having a gate connected to one of said subsense lines.

6. A comparator according to claim 1, wherein said first potential is a ground potential Vss, the second potential is a power supply potential Vcc, said load circuit is a p-channel MOSFET having a gate receiving a ground potential Vcc, and each of said switching elements is an npn bipolar transistor having a base connected to one of said subsense lines.

7. A comparator according to claim 1, wherein said first potential is a ground potential Vss, the second potential is a power supply potential Vcc, said load circuit is a p-channel MOSFET having a gate receiving a precharge signal, and each of said switching elements is an npn bipolar transistor having a base connected to one of said subsense lines.

8. A comparator according to claim 1, wherein said first potential is a ground potential Vss, the second potential is a power supply potential Vcc, said load circuit is a pnp bipolar transistor having a base receiving a ground potential Vss, and each of said switching elements is an npn bipolar transistor having a base connected to one of said subsense lines.

9. A comparator according to claim 1, wherein said first potential is a ground potential Vss, the second potential is a power supply potential Vcc, said load circuit is a pnp bipolar transistor having a base receiving a precharge signal, and each of said switching elements is an npn bipolar transistor having a base connected to one of said subsense lines.

10. A comparator according to claim 1, wherein said first potential is a power supply potential Vcc, the second potential is aground potential Vss, said load circuit is a p-channel MOSFET having a gate receiving the ground potential Vss, and each of said switching elements is an n-channel MOSFET having a gate connected to one of said subsense lines.

11. A comparator according to claim 1, wherein said first potential is a power supply potential Vcc, the second potential is a ground potential Vss, said load circuit is a p-channel MOSFET having a gate receiving a precharge signal, and each of said switching elements is an n-channel MOSFET having a gate connected to one of said subsense lines.

12. A comparator according to claim 1, wherein said first potential is a power supply potential Vcc, the second potential is a ground potential Vss, said load circuit is a pnp bipolar transistor having a base receiving the power supply potential Vss, and each of said switching elements is an n-channel MOSFET having a gate connected to one of said subsense lines.

13. A comparator according to claim 1, wherein said first potential is a power supply potential Vcc, the second potential is a ground potential Vss, said load circuit is a pnp bipolar transistor having a base receiving a precharge signal, and each of said switching elements is an n-channel MOSFET having a gate connected to one of said subsense lines.

14. A comparator according to claim 1, wherein said first potential is a power supply potential Vcc, the second potential is a ground potential Vss, said load circuit is a p-channel MOSFET having a gate receiving a ground potential Vcc, and each of said switching elements is an npn bipolar transistor having a base connected to one of said subsense lines.

15. A comparator according to claim 1, wherein said first potential is a power supply potential Vcc, the second potential is a ground potential Vss, said load circuit is a p-channel MOSFET having a gate receiving a precharge signal, and each of said switching elements is an npn bipolar transistor having a base connected to tone of said subsense lines.

16. A comparator according to claim 1, wherein said first potential is a power supply potential Vcc, the second potential is a ground potential Vss, said load circuit is a pnp bipolar transistor having a base receiving the ground potential Vss, and each of said switching elements is an npn bipolar transistor having a base connected to one of said subsense lines.

17. A comparator according to claim 1, wherein said first potential is a power supply potential Vcc, the second potential is a ground potential Vss, said load circuit is a pnp bipolar transistor having a base receiving a precharge signal, and each of said switching elements is an npn bipolar transistor having a base connected to one of said subsense lines.

18. A comparator according to claim 1, further comprising:
a plurality of n-channel load MOSFETs, each of said load MOSFETS having a gate and a source, said source receiving one of said subsense lines.

19. A comparator according to any one of claims 3, 5, 7, 9, 11, 13, 15, and 17, further comprising:
a load circuit having a plurality of n-channel MOSFETs each having a gate receiving a complementary precharge signal complementary to the precharge signal, a source receiving a power supply potential Vcc, and a drain connected to one subsense line.

20. A comparator according to claim 1, further comprising:
a load circuit having a plurality of bipolar transistors each having a base and a collector receiving a power supply potential Vcc and an emitter connected to one subsense line.

21. A comparator according to any one of claims 3, 5, 7, 9, 11, 13, 15, and 17, further comprising:
a load circuit having a plurality of bipolar transistors each having a base receiving a complementary precharge signal complementary to the precharge signal, a collector receiving a power supply potential Vcc, and an emitter connected to one subsense line.

22. A comparator according to claim 1, further comprising:
a load circuit having a plurality of n-channel MOSFETs each having a gate and a source receiving a ground potential Vss and a drain connected to one subsense line.

23. A comparator according to any one of claims 3, 5, 7, 9, 11, 13, 15, and 17, further comprising:
a plurality of n-channel load MOSFETs, each of said load MOSFETs having a gate receiving a complementary precharge signal complementary to the precharge signal, a source receiving a ground potential Vss, and a drain connected to one of said subsense lines.

24. A comparator according to claim 1, further comprising:
a plurality of bipolar load transistors, each of said load transistors having a base and an emitter, said emitter receiving a ground potential Vss and a collector connected to one of said subsense lines.

25. A comparator according to any one of claims 3, 5, 7, 9, 11, 13, 15, and 17, further comprising:
a plurality of bipolar load transistors, each of said load transistors having a base receiving a complementary precharge signal complementary to the precharge signal, an emitter receiving a ground potential Vss, and a collector connected to one of said subsense lines.

26. A comparator according to claim 1, wherein each of said bit comparators is a memory cell of a content addressable memory, and bit data input to said plurality of bit comparators are address data.

27. A comparator according to claim 26, wherein said content addressable memory is a tag memory section of a cache memory.

28. A comparator according to claim 1, wherein said main sense line and said parallel of subsense lines are arranged parallelly to each other.

29. A data comparator comprising:
bit data comprising means having a plurality of groups, each of said groups having a plurality of bit comparators, each of said bit comparators comparing internally input bit data with prestored bit data and giving as an output a comparison result;
output data coupling means having a plurality of subsense lines, each of said subsense lines being arranged in a respective one of said groups of said bit data comparing means and unifying output data from bit comparators of said respective one of said groups to which said each of said subsense lines belongs;
switching means having a plurality of switching elements, each of said switching elements being arranged in correspondence with a respective one of said subsense lines, having a control terminal, a first terminal, and a second terminal, and performing a switching operation in accordance with a potential of said respective one of said subsense lines connected to said control terminal, and said first terminal receiving a first potential;
a main sense line connected to said second terminals of said plurality of switching elements;
a load circuit having a third terminal and a fourth terminal, said third terminal being connected to said main sense line, and said fourth terminal receiving a second potential; and
arithmetic means having a plurality of logic gate circuits, each of said logic gate circuits having a plurality of input terminals and an output terminal connected to a respective one of said subsense lines, each of said input terminals being connected to one of said plurality of bit comparators which is connected to said respective one of said subsense lines to which said output terminal is connected.

30. A data comparator comprising:
bit data comparing means having a plurality of groups, each of said groups having a plurality of bit comparators, each of said bit comparators comparing internally input bit data with prestored bit data and giving as an output a comparison result;
output data coupling means having a plurality of subsense lines, each of said subsense lines being arranged in a respective one of said groups of said bit data comparing means and unifying output data from said bit comparators of said respective one of said groups to which said each of said subsense lines belongs;
switching means having a plurality of switching elements, each of said switching elements being arranged in correspondence with a respective one of said subsense lines, having a control terminal, a first terminal, and a second terminal, and performing a switching operation in accordance with a potential of said respective one of said subsense lines connected to said control terminal, and said first terminal receiving a first potential;
a main sense line connected to said second terminal of each of said plurality of switching elements;
a load circuit having a third terminal and a fourth terminal, said third terminal being connected to said main sense line, and said fourth terminal receiving a second potential; and
inverting means having a plurality of inverting circuits, each of said inverting circuits having an input terminal and an output terminal, said input terminal being connected to one of said subsense lines, and said output terminal being connected to a control terminal of one of said plurality of switching elements which is associated with said one of said subsense lines to which said input terminal is connected.

* * * * *

UNITED STATES PATENT AND TRADEMARK OFFICE
CERTIFICATE OF CORRECTION

PATENT NO. : 5,294,911
DATED : March 15, 1994
INVENTOR(S) : Masanori Uchida et al.

It is certified that error appears in the above-indentified patent and that said Letters Patent is hereby corrected as shown below:

Claim 1, column 7, line 67, change "comprising" to --comparing--. *

Claim 10, column 9, line 19, change "aground" to --a ground--.

Claim 15, column 9, line 57, change "tone" to --one--. *

Claim 28, column 11, line 2, change "parallel" to --plurality--. *

Claim 28, column 11, line 3, change "parallelly" to --parallel--. *

UNITED STATES PATENT AND TRADEMARK OFFICE
CERTIFICATE OF CORRECTION

PATENT NO. : 5,294,911
DATED : March 15, 1994
INVENTOR(S) : Masanori Uchida et al.

It is certified that error appears in the above-indentified patent and that said Letters Patent is hereby corrected as shown below:

Claim 29, column 11, line 5, change "comprising" to --comparing--.

Signed and Sealed this

Seventeenth Day of January, 1995

Attest:

BRUCE LEHMAN

Attesting Officer      Commissioner of Patents and Trademarks